United States Patent
Morita

(10) Patent No.: US 12,202,444 B2
(45) Date of Patent: Jan. 21, 2025

(54) WASHER CONTROL SYSTEM AND WASHER CONTROL DEVICE

(71) Applicant: DENSO ELECTRONICS CORPORATION, Anjo (JP)

(72) Inventor: Manabu Morita, Anjo (JP)

(73) Assignee: DENSO ELECTRONICS CORPORATION, Anjo (JP)

( * ) Notice: Subject to any disclaimer, the term of this patent is extended or adjusted under 35 U.S.C. 154(b) by 414 days.

(21) Appl. No.: 17/674,916

(22) Filed: Feb. 18, 2022

(65) Prior Publication Data

US 2022/0275557 A1 Sep. 1, 2022

(30) Foreign Application Priority Data

Feb. 26, 2021 (JP) .................. 2021-030285

(51) Int. Cl.
*B60S 1/48* (2006.01)
*G01F 9/00* (2006.01)
*D06F 34/08* (2020.01)
*D06F 34/14* (2020.01)
*D06F 39/08* (2006.01)

(52) U.S. Cl.
CPC .............. *B60S 1/481* (2013.01); *G01F 9/001* (2013.01); *D06F 34/08* (2020.02); *D06F 34/14* (2020.02); *D06F 39/087* (2013.01); *D06F 39/088* (2013.01)

(58) Field of Classification Search
CPC .......... G01F 9/001; G01F 9/008; G01F 22/00; G01F 23/00
See application file for complete search history.

(56) References Cited

U.S. PATENT DOCUMENTS

| 2012/0266926 | A1* | 10/2012 | Kikuta | B60S 1/0848 134/58 R |
| 2019/0271579 | A1* | 9/2019 | Weigert | G01F 23/804 |
| 2020/0139936 | A1 | 5/2020 | Yamauchi et al. | |
| 2021/0197769 | A1 | 7/2021 | Shirakura et al. | |

FOREIGN PATENT DOCUMENTS

| JP | S63109254 U | 7/1988 |
| JP | H05072619 U | 10/1993 |
| JP | 2007278108 A | 10/2007 |
| JP | 2016002929 A | 1/2016 |
| JP | 2019-018597 A | 2/2019 |
| JP | 2019069723 A | 5/2019 |

OTHER PUBLICATIONS

JP S63-109254U translation, Window Washer Liquid Quantity Indicator, Ito (Year: 1988).*

\* cited by examiner

*Primary Examiner* — Cristi J Tate-Sims
(74) *Attorney, Agent, or Firm* — Harness, Dickey & Pierce, P.L.C.

(57) ABSTRACT

A washer control device includes a computer configured to: monitor a motor current value that is a value of electric current supplied to a washer motor; acquire an energization time for which the electric current is supplied to the washer motor; and calculate a usage amount of a washer fluid from the motor current value and the energization time, and calculate, as a margin of the washer fluid, a remaining amount of the washer fluid in a washer tank based on the usage amount.

4 Claims, 6 Drawing Sheets

WASHER CONTROL SYSTEM AND WASHER CONTROL DEVICE

CROSS REFERENCE TO RELATED APPLICATION

The present application claims the benefit of priority from Japanese Patent Application No. 2021-030285 filed on Feb. 26, 2021. The entire disclosure of the above application is incorporated herein by reference.

TECHNICAL FIELD

The present disclosure relates to a washer control system and a washer control device applied to the washer control system.

BACKGROUND

Conventionally, a vehicle cleaning system has been proposed. The vehicle cleaning system automatically cleans a windshield glass when detecting dart on the windshield glass. The vehicle cleaning system includes a washer level sensor for detecting a remaining amount of a washer fluid. The vehicle cleaning system determines whether or not the remaining amount of the washer fluid is at least a certain value sufficient to operate a washer pump using the washer level sensor, operates the washer pump when the remaining amount is at least the certain value, and notifies a user when the remaining amount is less than the certain value.

SUMMARY

The present disclosure provides a washer control system and a washer control device applied to the washer control system. A washer control device includes a controller configured to: monitor a motor current value that is a value of electric current supplied to a washer motor; acquire an energization time for which the electric current is supplied to the washer motor; calculate a usage amount of a washer fluid from the motor current value and the energization time; and calculates, as a margin of the washer fluid, a remaining amount of the washer fluid in a washer tank based on the usage amount.

BRIEF DESCRIPTION OF DRAWINGS

Objects, features and advantages of the present disclosure will become apparent from the following detailed description made with reference to the accompanying drawings. In the drawings.

DETAILED DESCRIPTION

Figure 1:
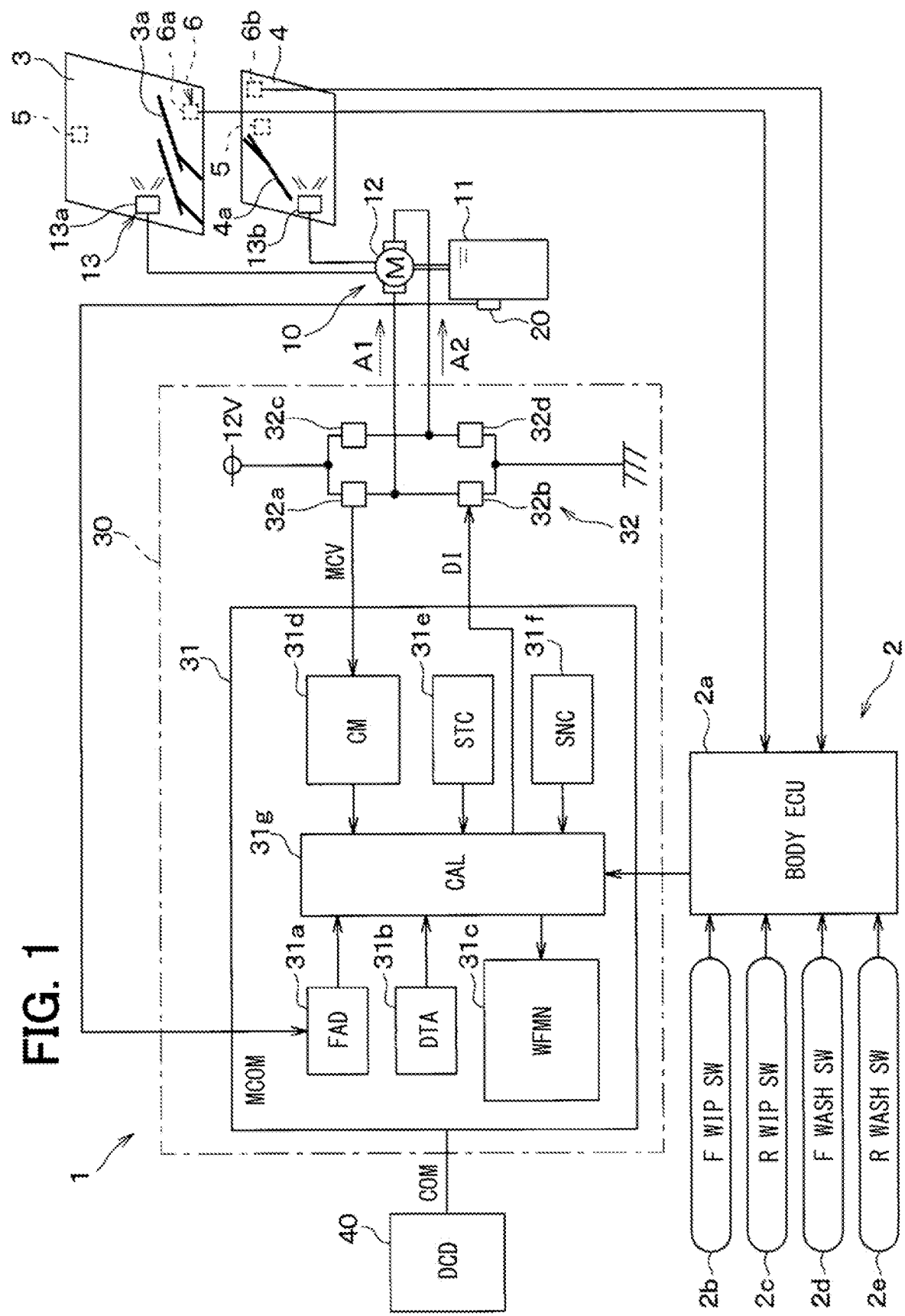
FIG. 1 is a diagram showing a schematic configuration of a washer control system according to a first embodiment.

Autonomous driving by an advanced driver assistance system (hereinafter referred to as ADAS) is performed by obtaining various information by a situation monitoring device such as various cameras and sensors. If the situation monitoring device for maintaining the function becomes dirty during autonomous driving, the function related to the ADAS may be deteriorated. Therefore, a measure for removing dirt attached to the situation monitoring device by a washer control system has been studied.

In order to grasp a remaining amount of a washer fluid, it is conceivable to use one washer level sensor and confirm the presence or absence of the washer fluid.

However, using only one washer level sensor is a binary determination that can determine whether or not the remaining amount of the washer fluid reaches a constant value. Thus, there is a possibility that insufficiency of the washer fluid is notified only when the remaining amount of the washer fluid is exhausted, and the situation monitoring device cannot be cleaned during autonomous driving.

In order to deal with such an issue, it is conceivable to set a threshold value of the fluid amount detected by the washer level sensor to a value higher than 0. However, since the frequency of use of the washer fluid changes depending on the usage environment, it is difficult to predict the remaining amount of the washer fluid, and it is difficult to maintain the function during autonomous driving.

It is also conceivable to prepare multiple washer level sensors and to grasp the remaining amount of the washer fluid in multiple stages. However, the number of parts in a system increases, such as the need for multiple washer level sensors, and the cost of the system also increases.

A washer control system according to a first aspect of the present disclosure includes a situation monitoring device configured to monitor a situation related to traveling of a vehicle, a washer tank configured to store a washer fluid, a washer motor configured to perform washer spraying by suctioning the washer fluid stored in the washer tank and discharging the washer fluid in order to remove dirt that hinders monitoring by the situation monitoring device, in response to energization to the washer motor, and a washer control device configured to control the washer spraying by controlling the energization to the washer motor. The washer control device includes a computer configured to: monitor a motor current value that is a value of electric current supplied to the washer motor; acquire an energization time for which the electric current is supplied to the washer motor; calculate a usage amount of the washer fluid from the motor current value and the energization time; and calculate, as a margin of the washer fluid, a remaining amount of the washer fluid in the washer tank based on the usage amount.

In this way, the usage amount of the washer fluid can be calculated from the motor current value, which is the value of the electric current supplied to the washer motor, and the energization time. Based on the usage amount, the remaining amount of the washer fluid in the washer tank can be calculated. Accordingly, it is possible to notify the margin of the washer fluid such as the remaining amount of the washer fluid. Therefore, a driver or the like can grasp the margin of the washer fluid, and can be urged to replenish the washer fluid before the washer fluid is exhausted. Further, it is possible to grasp the margin of the washer fluid with a simple system configuration without providing multiple washer level sensors.

A washer control device according to a second aspect of the present disclosure includes a computer configured to: monitor a motor current value that is a value of electric current supplied to a washer motor that performs washer spraying by suctioning a washer fluid stored in a washer tank and discharging the washer fluid in order to remove dirt that hinders monitoring by a situation monitor that monitors a situation related to traveling of a vehicle; acquire an energization time for which the electric current is supplied to the washer motor; and calculate a usage amount of the washer fluid from the motor current value and the energization time, and calculate, as a margin of the washer fluid, a remaining amount of the washer fluid in the washer tank based on the usage amount.

The washer control device according to the second aspect can achieve effects similar to the effects by the washer control system according to the first aspect.

Hereinafter, embodiments of the present disclosure will be described with reference to the drawings. In the following embodiments, the same or equivalent parts are denoted by the same reference numerals.

First Embodiment

A washer control system 1 according to a first embodiment will be described with reference to FIG. 1. FIG. 1 is a circuit configuration diagram in which a wiper control system 2 is added to the washer control system 1 according to the present embodiment. In the present embodiment, the case where the washer control system 1 is applied to a system that sprays a washer fluid according to the instruction from the wiper control system 2 will be described as an example. However, the washer control system 1 may also be applied to a system that sprays the washer fluid independently of the wiper control system 2.

First, the wiper control system 2 will be described. The wiper control system 2 is a system that controls a front wiper 3a for wiping off dirt and the like on a front windshield 3 provided in a vehicle and a rear wiper 4a for wiping off dirt and the like on a rear windshield 4. The wiper control system 2 performs wiper control, washer instruction, and the like based on instructions from an electronic control unit (ECU) provided in the vehicle, for example, a body ECU 2a. The body ECU 2a is one of in-vehicle ECUs, and performs various functions related to the vehicle. Examples of the various functions include wiper control and washer instruction. Here, only parts related to the wiper control and the washer instruction among the functions performed by the body ECU 2a will be described.

Specifically, the body ECU 2a receives control signals indicating operating states of a front wiper switch (F WIP SW) 2b, a rear wiper switch (R WIP SW) 2c, a front washer switch (F WASH SW) 2d, and a rear washer switch (R WASH SW) 2e provided in a steering column portion (not shown). When a control signal for operating the front wiper 3a or the rear wiper 4a is input, the body ECU 2a drives a wiper motor (not shown) for operating the front wiper 3a or the rear wiper 4a based on the control signal.

Further, when the control signal for operating the front washer switch 2d or the rear washer switch 2e is input, the body ECU 2a outputs a control signal of the washer instruction to the washer control system 1 so that the corresponding washer spray is performed. In addition, the body ECU 2a drives a wiper motor (not shown) to operate the corresponding front wiper 3a or rear wiper 4a at the same time for a certain period of time when the washer spray is performed.

Further, the body ECU 2a receives a monitoring result by a dirt monitoring unit 6. The dirt monitoring unit 6 has a configuration including a front monitoring unit 6a and a rear monitoring unit 6b, and monitors the adhesion of dirt to the front windshield 3 and the adhesion of dirt to the rear windshield 4, respectively. Inside the front windshield 3 and the rear windshield 4, that is, on the vehicle interior side, various situation monitoring devices 5 for monitoring the situation related to the traveling of the vehicle such as various cameras and sensors used for autonomous driving by an ADAS are mounted. Therefore, the adhesion of dirt to the front windshield 3 and the rear windshield 4 hinders monitoring by the various situation monitoring devices 5, and may reduce the functions of the various situation monitoring devices 5. Therefore, the dirt monitoring unit 6 monitors the adhesion of dirt, and conveys the monitoring result to the body ECU 2a. If there is the adhesion of dirt, the body ECU 2a outputs the control signal of the washer instruction to a washer control device 30 so that the corresponding washer spray is performed.

When the situation monitoring device 5 is a camera, the dirt monitoring unit 6 may detect dirt from an image captured by the camera. The dirt monitoring unit 6 may also detect dirt based on a change in a reflectance depending on the presence or absence of dirt, such as an infrared sensor. Further, although it is shown here that the monitoring result is directly transmitted from the dirt monitoring unit 6 to the body ECU 2a, another form may be used. For example, a monitoring signal of the dirt monitoring unit 6 is transmitted to another in-vehicle ECU that controls autonomous driving by the ADAS, and the in-vehicle ECU determines the presence or absence of dirt to obtain a monitoring result, and transmits the monitoring result to the body ECU 2a.

Next, the washer control system 1 will be described. The washer control system 1 of the present embodiment is configured to include a washer device 10, a washer level sensor 20, the washer control device 30, a display control device (DCD) 40, and the like.

The washer device 10 is a part constituting a mechanical structure for spraying the washer fluid to the front windshield 3 and the rear windshield 4, and includes a washer tank 11, a washer motor 12, and a washer sprayer 13.

The washer tank 11 stores the washer fluid inside, and the washer fluid in the washer tank 11 is used to clean the dirt attached to the front windshield 3 and the rear windshield 4. The allowable limit fluid amount of the washer fluid that can be stored in the washer tank 11, in other words, the upper limit of the washer level is fixed, and the value obtained by subtracting the amount of the washer fluid used from the allowable limit fluid amount is the remaining amount of the washer fluid. However, when the remaining amount of the washer fluid is equal to or more than a predetermined value, it is not necessary for the washer fluid to estimate the remaining amount of the washer fluid because the fluid amount is not insufficient. Therefore, in the present embodiment, when the washer level sensor 20 detects that the remaining amount of the washer fluid reaches the predetermined value, the remaining amount of the washer fluid is estimated from there. This will be described later.

The washer motor 12 is a pump-integrated motor that also has a function as a washer pump, and is controlled by the washer control device 30. When the washer motor 12 is driven by the washer control device 30, the washer fluid is suctioned and discharged toward the washer sprayer 13. In the present embodiment, the washer motor 12 is composed of a motor capable of forward/reverse rotation depending on the direction of energization, and a built-in switching valve allows switching of a discharge port of the washer fluid between the time of forward rotation and the time of reverse rotation. Then, the washer fluid is discharged to a front sprayer 13a, which will be described later, at the time of forward rotation, and the washer fluid is discharged to a rear sprayer 13b at the time of reverse rotation. The amount of washer fluid discharged from the washer motor 12 to the washer sprayer 13 is an amount corresponding to the rotation speed of the washer motor 12.

The washer sprayer 13 discharges the washer fluid discharged from the washer motor 12 toward the front windshield 3 and the rear windshield 4. Specifically, the washer sprayer 13 includes the front sprayer 13a that sprays the washer fluid toward the front windshield 3 and the rear sprayer 13b that sprays the washer fluid toward the rear windshield 4. The washer fluid is discharged to the front sprayer 13a and is sprayed onto the front windshield 3 at the time of forward rotation of the washer motor 12. The washer fluid is discharged to the rear sprayer 13b and is sprayed onto the rear windshield 4 at the time of reverse rotation of the washer motor 12. Then, in addition to the washer fluid being sprayed, the wiper control system 2 drives the front wiper 3a and the rear wiper 4a to clean and remove the dirt attached to the front windshield 3 and the rear windshield 4.

The washer level sensor 20 detects the remaining amount of the washer fluid stored in the washer tank 11 and informs the washer control device 30. For example, the washer level sensor 20 detects that the remaining amount of the washer fluid reaches the predetermined value based on the height of the fluid level of the washer tank 11, and the washer level sensor 20 includes a fluid level detection switch that is turned off until the height of the remaining amount of the washer fluid reaches the predetermined value and is turned on when the height of the remaining amount of the washer fluid reaches the predetermined value. The washer level sensor 20 performs a binary determination to determine whether or not the remaining amount of the washer fluid reaches the predetermined value, and the determination result is informed to the washer control device 30 as a detection result of the remaining amount of the washer fluid. Then, the detection result is used for a remaining amount estimation of the washer fluid performed by the washer control device 30. The details of the remaining amount estimation of the washer fluid will be described later.

The washer control device 30 controls the washer spray by controlling the energization of the washer motor 12. Specifically, when the washer control device 30 receives the control signal of the washer instruction from the body ECU 2a, the washer control device 30 drives the washer motor 12 based on the control signal to spray the washer fluid. The control signal of the washer instruction transmitted from the body ECU 2a also includes whether the washer motor 12 is to be rotated in the forward direction or the reverse direction, that is, whether the washer fluid is to be sprayed onto the front windshield 3 or the rear windshield 4. Therefore, the washer control device 30 rotates the washer motor 12 in the forward direction or the reverse direction based on the control signal, so that the washer fluid is sprayed onto the required one of the front windshield 3 and the rear windshield 4.

As described above, the body ECU 2a outputs the control signal of the washer instruction when the front washer switch 2d or the rear washer switch 2e is operated, or when receiving the monitoring result that the dirt is attached from the dirt monitoring unit 6. Therefore, the washer control device 30 performs the corresponding washer spray when the driver requests the operation of the wiper and when dirt is attached to the front windshield 3 or the rear windshield 4. Then, by spraying the washer fluid when dirt is attached to the front windshield 3 and the rear windshield 4, it is possible to suppress deterioration of the function of the situation monitoring device 5 mounted inside the front windshield 3 or the rear windshield 4.

Specifically, the washer control device 30 includes a microcomputer (MCOM) 31 and a switch unit 32.

The microcomputer 31 constitutes a controller including a CPU, ROM, RAM, I/O, and the like, and controls the drive of the washer motor 12 to spray the washer fluid by controlling the switch unit 32 according to a program stored in the ROM or the like. Specifically, when a control signal of the washer instruction is input from the body ECU 2a, the microcomputer 31 outputs a drive instruction signal (DI) to the switch unit 32 to drive the washer motor 12. Accordingly, the switch unit 32 is controlled to supply an electric current to the washer motor 12, the washer motor 12 is driven, and the washer fluid is sprayed.

The control signal of the washer instruction input from the body ECU 2a also includes data indicating onto which of the front windshield 3 and the rear windshield 4 the washer fluid is to be sprayed. Therefore, the microcomputer 31 controls the switch unit 32 by the drive instruction signal, sets the direction of the current, and supplies the current to the washer motor 12, so that the washer motor 12 rotates in the forward direction or the reverse direction.

Further, the microcomputer 31 detects that the remaining amount of the washer fluid reaches the predetermined value by inputting the detection signal from the washer level sensor 20. Further, the microcomputer 31 acquires date and time information such as date and time by communicating (COM) with the display control device 40, and estimates the remaining amount of the washer fluid based on the date and time information and the detection signal of the washer level sensor 20. Then, the microcomputer 31 prompts the driver to replenish the washer fluid by displaying a display indicating a margin of the washer fluid when the remaining amount of the washer fluid becomes equal to or less than the predetermined value.

Specifically, the microcomputer 31 has, as each functional unit that realizes the above functions, a fluid amount detection unit (FAD) 31a, a date/time acquisition unit (DTA) 31b, a washer fluid margin notification unit (WFMN) 31c, a current monitoring unit (CM) 31d, a spray time counting unit (STC) 31e, and a spray number counting unit (SNC) 31f, and a calculation unit (CAL) 31g.

The fluid amount detection unit 31a receives the detection signal of the washer level sensor 20, detects that the remaining amount of the washer fluid reaches the predetermined value, and notifies the calculation unit 31g of it. In the present embodiment, the fluid amount detection unit 31a detects that the remaining amount of the washer fluid reaches the predetermined value, for example, when the remaining amount of the washer fluid reaches 50%. However, it is sufficient that the fluid amount detection unit can be detect that the remaining amount of the washer fluid is in a range more than 0% and less than 100%.

The date/time acquisition unit 31b acquires date/time information such as a date and a time from the display control device 40 and notifies the calculation unit 31g of them. Here, the date/time acquisition unit 31b acquires the date/time information from the display control device 40. However, since it is sufficient if the date/time information can be acquired through an in-vehicle communication system such as an in-vehicle local area network (LAN), the date/time information may be acquired from the in-vehicle ECU of a different vehicle.

The washer fluid margin notification unit 31c notifies the display control device 40 of a margin of the washer fluid based on the remaining amount of the washer fluid. The margin of the washer fluid is an index indicating how much the washer fluid can be used afterwards, and is calculated by the calculation unit 31g. The remaining amount of the washer fluid itself, a usage time limit such as how many days the washer fluid can be used, or how many months and days the washer fluid can be used are notified to the display control device 40 as the margin of the washer fluid.

The current monitoring unit 31d monitors a current value supplied to the washer motor 12 (hereinafter referred to as a motor current value (MCV)) in real time, and notifies the calculation unit 31g of the motor current value. A rotation speed of the washer motor 12 (hereinafter referred to as a motor rotation speed) is obtained by integrating the energization time of the washer motor 12 (hereinafter referred to as motor energization time) with respect to the motor current value monitored by the current monitoring unit 31d. Since the usage amount of the washer fluid, that is, the consumed amount of the washer fluid is correlated with the motor rotation speed, for example, is proportional to the motor rotation speed, it is possible to calculate the usage amount of the washer fluid based on the motor rotation speed. Therefore, the current monitoring unit 31d monitors the motor current value.

The spray time counting unit 31e counts the spray time of the washer fluid. The spray time of the washer fluid is a time corresponding to the motor energization time, and the spray time counting unit 31e corresponds to an energization time acquisition unit. When calculating the motor rotation speed described above, the spray time of the washer fluid is used as the motor energization time. As will be described later, since the washer motor 12 is driven by outputting the drive instruction signal from the calculation unit 31g to the switch unit 32, the spray time counting unit 31e counts the output time of the drive instruction signal in order count the spray time of the washer fluid.

The spray time counting unit 31f counts the number of times the washer fluid is sprayed. Here, the number of times the washer fluid is sprayed while the ignition switch is on is counted. In another example, the number of times of the washer fluid is sprayed from the start of using the washer fluid, for example, from when the washer fluid is replenished to fill the washer tank 11 in a full state, that is, a state in which the allowable limit fluid amount is satisfied. The number of times the washer fluid is sprayed is counted as one when the washer motor 12 is continuously energized regardless of the length of the energization time of the washer motor 12.

The calculation unit 31g controls the switch unit 32 based on the control signal of the washer instruction from the body ECU 2a, and sprays the washer fluid by supplying the electric current to the washer motor 12. The control signal of the washer instruction transmitted from the body ECU 2a also includes whether the washer motor 12 is to be rotated in the forward direction or the reverse direction, that is, whether the washer fluid is to be sprayed onto the front windshield 3 or the rear windshield 4. Therefore, the washer control device 30 rotates the washer motor 12 in the forward direction or the reverse direction based on the control signal, so that the washer fluid is sprayed onto the required one of the front windshield 3 and the rear windshield 4.

Further, the calculation unit 31g calculates the usage amount of the washer fluid for each use (hereinafter referred to as the usage amount per use) based on the motor current value transmitted from the current monitoring unit 31d and the spray time of the washer fluid corresponding to the motor energization time, and calculates the cumulative value of the usage amount (hereinafter referred to as the cumulative usage amount). Then, the calculation unit 31g calculates an estimated line indicating a change in the daily usage amount based on the calculation result of the usage amount per use and the cumulative usage amount. After the washer level sensor 20 detects that the remaining amount of the washer fluid reaches the predetermined value, the calculation unit 31g also calculates the remaining amount of the washer fluid and the usage time limit.

Although the details will be described later, the calculation unit 31g calculates the amount of decrease in the remaining amount of the washer fluid during a predetermined period, for example, for several consecutive days from an optional day, from the daily usage amount and the cumulative usage amount, and linearly approximates the amount of decrease to calculate the estimated line. Further, since the calculation unit 31g can confirm with the washer level sensor 20 that the remaining amount of the washer fluid reaches the predetermined value, when the washer fluid is further used after the remaining amount of the washer fluid reaches the predetermined value, the calculation unit 31g calculates the remaining amount of the washer fluid by subtracting the usage amount from the predetermined value. Further, the calculation unit 31g also calculates the usage time limit of the washer fluid based on the calculated estimation line. That is, the calculation unit 31g calculates how many days the washer fluid can be used by calculating the intercept of the estimated line, and further calculates the specific date (month and date) until when the washer fluid can be used based on the date information acquired by the date/time acquisition unit 31b and the calculation result of how many days the washer fluid can be used. Then, the calculation unit 31g transmits data regarding the margin of the washer fluid to the washer fluid margin notification unit 31c.

The margin of the washer fluid is notified to the washer fluid margin notification unit 31c from the time when the washer level sensor 20 detects that the remaining amount of the washer fluid is equal to or less than the predetermined value. Therefore, the start timing at which the margin of the washer fluid is transmitted is determined according to the value detected by the washer level sensor 20. Here, since the washer level sensor 20 is set so as to detect that the remaining amount of the washer fluid reaches 50% of the allowable limit fluid amount, in the following explanation, the remaining amount of the washer fluid being the predetermined value is explained as the remaining amount of the washer fluid being 50%. However, the predetermined value can be appropriately set, and does not necessarily have to be 50%.

In the case where the washer motor 12 continues to be driven even after the remaining amount of the washer fluid becomes 0%, the motor rotation speed increases. Therefore, the remaining amount of the washer fluid will be calculated as a negative value if the amount of the usage amount of the washer fluid is calculated from the motor rotation speed. Therefore, even if the washer motor 12 is continuously driven after the remaining amount of the washer fluid becomes 0%, the remaining amount of the washer fluid is calculated to be 0%. The fact that the remaining amount of the washer fluid becomes 0% can be specified based on the motor current value. When the remaining amount of the washer fluid becomes 0%, the washer fluid is exhausted and the washer motor 12 is driven without load, so that the motor current value becomes smaller than when the washer fluid is present under load. Therefore, by setting the threshold value larger than a no-load current value and smaller than a load current value, it can be specified that the remaining amount of the washer fluid is 0% when the motor current value is smaller than the threshold value.

On the other hand, the switch unit 32 controls the supply of the motor current to the washer motor 12. In the present embodiment, the switch unit 32 is configured to be able to control the direction of the motor current so that the washer motor 12 can be rotated not only in the forward direction but also in the reverse direction. However, the switch unit 32 may be just an on/off switch if the washer motor 12 is rotated in only one direction. Here, the switch unit 32 is configured by an H-bridge circuit so that the direction can be controlled in addition to the on/off of the motor current.

The H-bridge circuit includes a first switch 32a, a second switch 32b, a third switch 32c, and a fourth switch 32d. Then, a circuit in which the first switch 32a and the second switch 32b are connected in series and a circuit in which the third switch 32c and the fourth switch 32d are connected in series are connected in parallel, and midpoints of the circuits are connected to respective ends of the washer motor 12 to form the H-bridge circuit. The H-bridge circuit causes the motor current to flow in a predetermined direction with respect to the washer motor 12 by turning on each switch arranged diagonally and turning off each switch on the other side. Specifically, the motor current flows in the direction of the arrow A1 in FIG. 1 when the first switch 32a and the fourth switch 32d are turned on and the second switch 32b and the third switch 32c are turned off, and the motor current flows in the direction of the arrow A2 in FIG. 1 when the first switch 32a and the fourth switch 32d are turned off and the second switch 32b and the third switch 32c are turned on. Accordingly, the washer motor 12 can be rotated in the forward direction or the reverse direction.

The display control device 40 controls the display of the margin of the washer fluid by a display (not shown), and includes, for example, an in-vehicle meter device. The display control device 40 makes it possible to notify the driver of the margin of the washer fluid by displaying the margin of the washer fluid on the display. The display may be any display as long as it can be visually recognized by the driver, and for example, a display panel or the like can be used.

The washer control system 1 and the wiper control system 2 according to the present embodiment are configured as described above. Next, the operation of the washer control system 1 and the wiper control system 2 configured in this way will be described.

First, when the driver performs an operation for operating the front wiper switch 2b or the rear wiper switch 2c, an operation signal input to the body ECU 2a, and the corresponding wiper motor is driven based on the control signal from the body ECU 2a. Accordingly, the front wiper 3a or the rear wiper 4a is operated. Then, when the driver performs an operation for terminating the operation of the front wiper switch 2b or the rear wiper switch 2c, a termination signal input to the body ECU 2a, the control signal from the body ECU 2a is released, and the wiper motor is stopped. Accordingly, the operation of the front wiper 3a or the rear wiper 4a is terminated.

When the driver operates the front washer switch 2d or the rear washer switch 2e, a washer operation signal is input to the body ECU 2a, the control signal is output from the body ECU 2a to the corresponding wiper motor, and the control signal for washer instruction is also output. Accordingly, the washer motor 12 is rotated in the forward direction or the reverse direction, the washer fluid is sprayed onto the front windshield 3 or the rear windshield 4, and the front wiper 3a or the rear wiper 4a is operated for a certain period of time. As a result, dirt and the like on the front windshield 3 or the rear windshield 4 is wiped off by the front wiper 3a or the rear wiper 4a.

Further, when the dirt adhesion to the front windshield 3 or the rear windshield 4 is detected by the monitoring of the dirt monitoring unit 6, the monitoring result is input to the body ECU 2a. Accordingly, when dirt is attached, the body ECU 2a outputs the control signal of the washer instruction to the washer control device 30 so that the corresponding washer spray is performed, and the control signal is also sent to the corresponding wiper motor. Then, the washer motor 12 is rotated in the forward direction or the reverse direction, the washer fluid is sprayed onto the front windshield 3 or the rear windshield 4, and the front wiper 3a or the rear wiper 4a is operated. As a result, dirt and the like on the front windshield 3 or the rear windshield 4 is wiped off by the front wiper 3a or the rear wiper 4a.

After that, when the dirt is wiped off and the dirt is no longer detected by the dirt monitoring unit 6, the monitoring result is input to the body ECU 2a. As a result, the control signal of the washer instruction and the control signal to the wiper motor are released, and the washer spraying is completed.

Further, when the washer spraying is performed at the time of request from the driver or when dirt is detected, the calculation unit 31g calculates the estimated line indicating changes in the usage amount of the washer fluid and the usage amount of each day. Then, when the washer level sensor 20 detects that the remaining amount of the washer fluid reaches 50%, the calculation unit 31g calculates the remaining amount of the washer fluid and the margin of the washer fluid such as the usage time limit. Then, the margin of the washer fluid is transmitted to the display control device 40, and the driver is notified by displaying the margin through the display (not shown).

Figure 2:
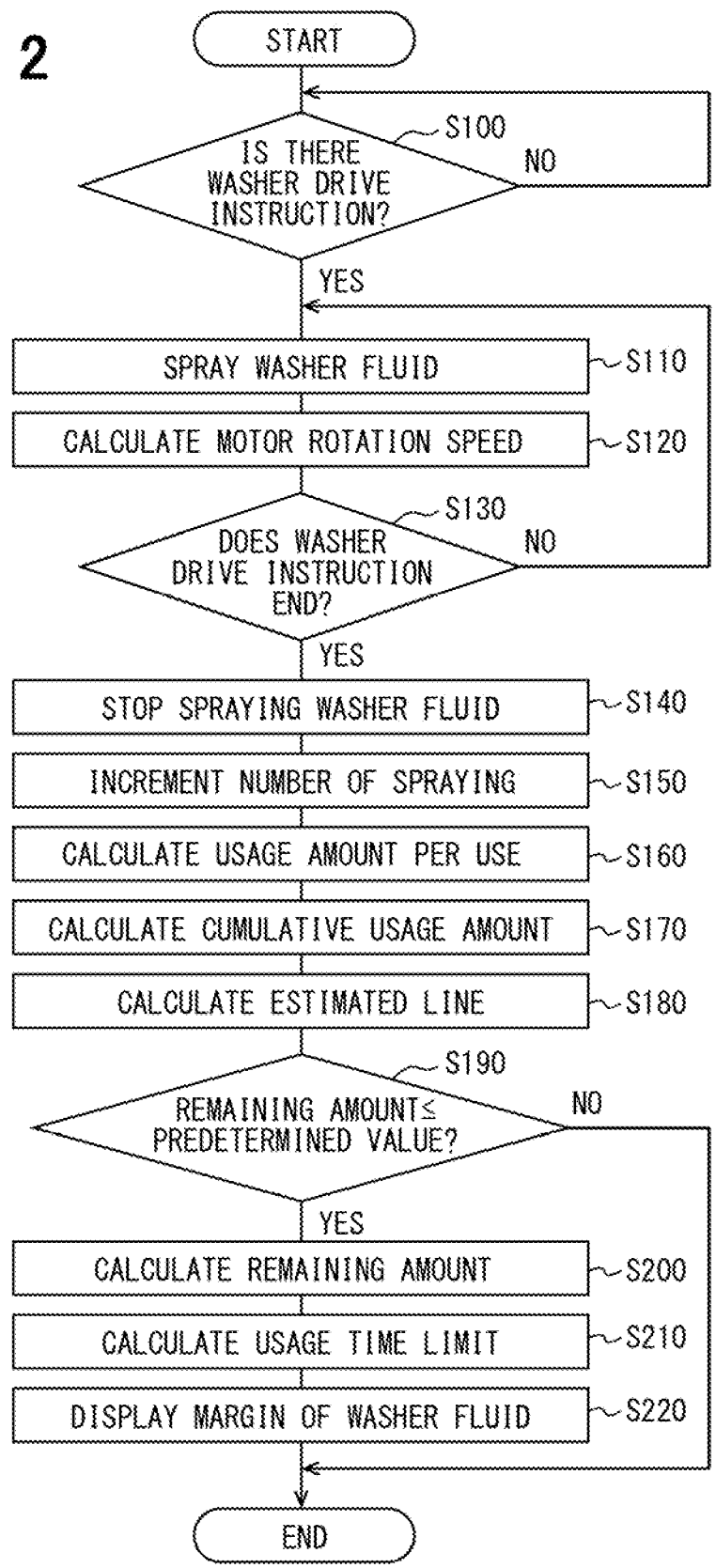
FIG. 2 is a flowchart showing details of washer control processing.

Specifically, each functional unit of the microcomputer 31 of the washer control device 30 cooperates to perform the washer control process shown in FIG. 2.

First, in S100, it is determined whether or not there is a washer drive instruction. Here, it is determined that there is the washer drive instruction when the control signal of the washer instruction is input from the body ECU 2a. Then, this process is repeated until the control signal of the washer instruction is input.

If an affirmative determination is made in S100, the process proceeds to S110, and washer spraying is performed. That is, based on the control signal of the washer instruction, the washer motor 12 is rotated in the forward direction or the reverse direction, and the washer fluid is sprayed onto the front windshield 3 or the rear windshield 4. Further, the process proceeds to S120, and the motor rotation speed during the washer spraying is calculated. Further, in S130, it is determined whether or not the washer drive instruction ends, the processes of S110 and S120 are continued until the washer drive instruction ends, and the process proceeds to S140 when the washer drive instruction ends. Then, the washer spray is stopped in S140.

After that, the process proceeds to S150, the number of times the washer fluid is sprayed, that is, the number of sprayings is incremented by one, and then the amount of washer fluid used peruse is calculated in S160. Specifically, the amount of the washer fluid used by the washer spraying of this time is calculated based on the motor rotation speed calculated in S120. Next, the process proceeds to S170, and a cumulative usage amount of the washer fluid is calculated. The cumulative usage amount can be calculated as the cumulative value of the usage amount per spraying, and if the cumulative usage amount is calculated every time the day changes, a daily usage amount can also be calculated. Then, the process proceeds to S180, and the estimated line indicating the change in the daily usage amount.

Here, a method of calculating the estimated line showing the change in daily usage will be described with reference to FIGS. 3 and 4.

Figure 3:
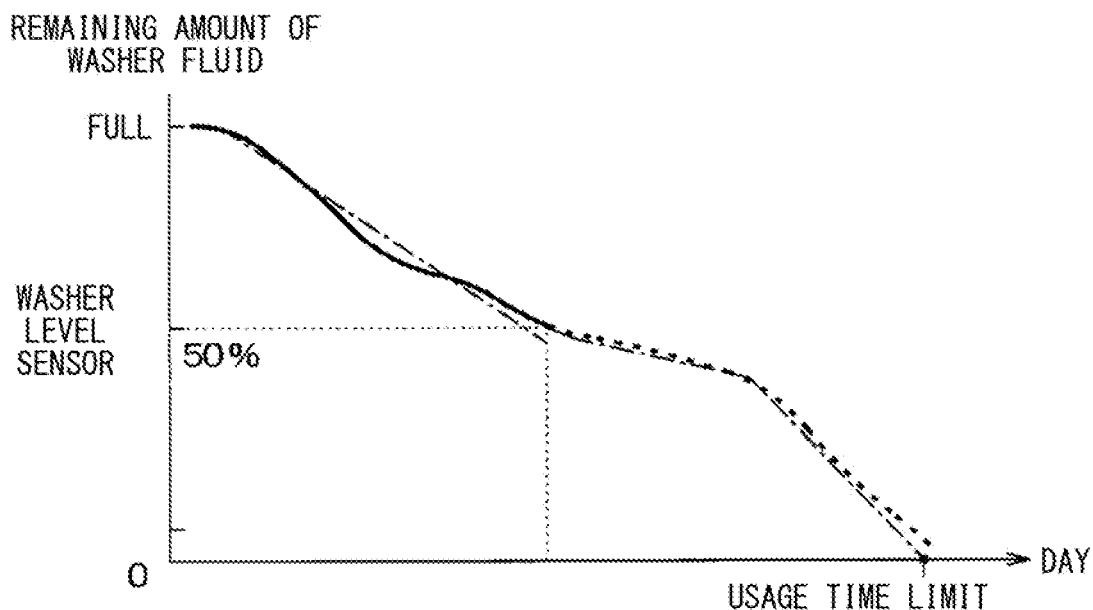
FIG. 3 is a diagram showing an example of daily changes in a remaining amount of a washer fluid and an estimated line.

The estimated line is a line that linearly approximates the change in the remaining amount of the washer fluid due to daily washer spraying, as shown by the alternate long and short dash line in FIG. 3. For example, the estimated line is calculated by calculating the amount of decrease in the remaining amount of the washer for several consecutive days from an optional day and linearly approximating it. The change in the remaining amount of washer fluid of each day can be obtained by subtracting the daily usage amount, that is, the cumulative usage amount calculated each time the day changes, from a reference value with the remaining amount of the washer fluid on the optional day as the reference value. Then, the daily change in the remaining amount of the washer fluid from the optional is plotted as a daily transition. Accordingly, the relationship between the number of days elapsed from the optional day and the remaining amount of the washer fluid can be understood. Based on this relationship, it is possible to calculate the estimated line indicating the relationship between the number of days elapsed from the optional day and the remaining amount of the washer fluid by linear approximation.

Figure 4:
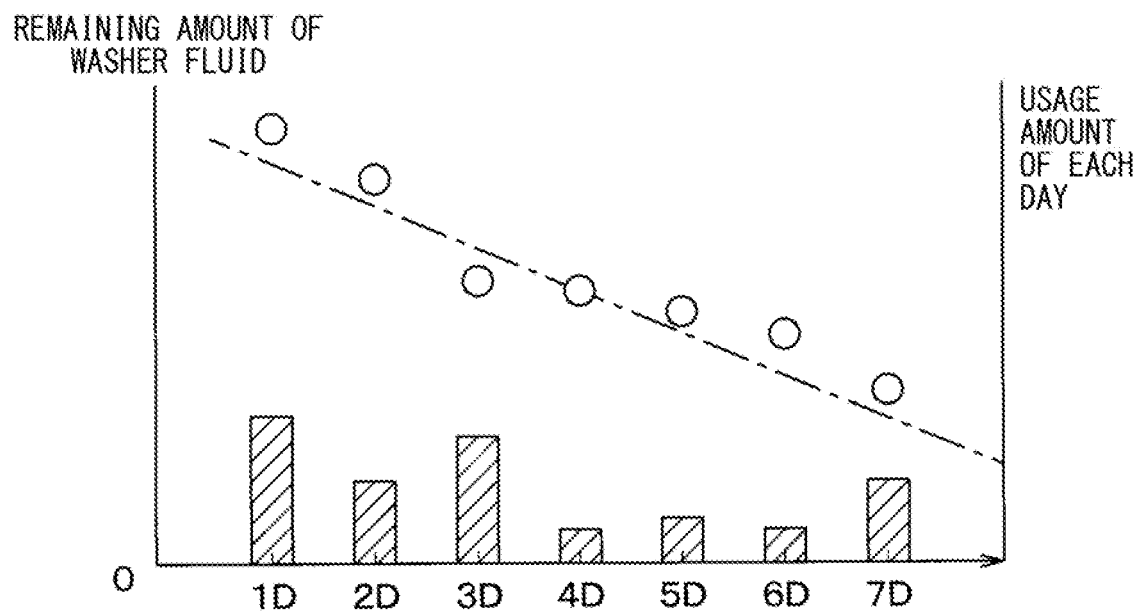
FIG. 4 is a diagram illustrating an example of a method of calculating an estimated line.

FIG. 4 shows a case where the estimated line is calculated based on a change in the remaining amount of the washer fluid for one week, for example, by setting one week before the present time as the optional day. As shown in FIG. 4, assuming that the daily usage amount for each week is represented by a bar graph with hatching, the remaining amount of the washer fluid in one week changes as shown in the plot. The estimated line can be calculated by approximating the amount of the washer fluid used per week to the linear equation of $Y=aX+b$ using the least squares method based on this daily plot of the remaining amount of the washer fluid. In the linear equation, Y is the remaining amount of the washer fluid, X is the number of usable days, and a and b are coefficients and constants obtained by linear approximation.

In addition, an approximate expression of the similar linear equation is calculated every week, and the estimation line is updated every week. Accordingly, the estimated line can be calculated based on the latest information, and the usage time limit of the washer fluid can be calculated more appropriately. Instead of updating the estimated line every week, the estimated line may be updated every day based on the data for the latest week by shifting the plot for one week used to obtain the estimated line by one day each time one day elapses. In the present embodiment, when the remaining amount of the washer fluid is larger than the predetermined value, the remaining amount of the washer fluid cannot be grasped yet, but the slope of the estimated line can be obtained. Therefore, when it is detected that the remaining amount of the washer fluid reaches the predetermined value in the subsequent processing, it is possible to immediately calculate the usage time limit based on the estimated line.

After calculating the estimated line in this way, the process proceeds to S190, and it is determined whether or not the remaining amount of the washer fluid is equal to or less than a predetermined value, here 50%. As described above, the washer level sensor 20 can detect that the remaining amount of the washer fluid reaches 50%. Therefore, after the washer level sensor 20 detects that the remaining amount of the washer fluid reaches 50%, an affirmative determination is made in S190.

Then, if an affirmative determination is made in S190, the process proceeds to S200, and the remaining amount of the washer fluid is calculated. In S180 described above, the estimated line is calculated using the remaining amount of the washer fluid on any day as a reference value tentatively assumed. However, since the timing at which the washer level sensor 20 detects that the remaining amount of the washer fluid reaches 50% can be grasped in S190, it is assumed that the remaining amount of the washer fluid reaches 50% at that time, and the remaining amount of the washer fluid can be calculated at any time by subtracting the amount used from the above time from the remaining amount of the washer fluid 50%.

After that, the process proceeds to S210, a usage time limit is calculated based on the date when the estimated line is calculated, the remaining amount of the washer fluid at that time, and the estimated line. The usage time limit indicates the number of days that the washer fluid can be used in the future or a specific date the washer fluid can be used at the longest. That is, the usage time limit can be obtained by calculating the intercept of the axis representing the number of days in the estimated line represented by the linear equation, or the intercept of the X axis in FIG. 3. Since the estimated line is calculated before the remaining amount of the washer fluid reaches 50%, the usage time limit can be calculated immediately after the remaining amount of the washer fluid reaches 50%. In this way, the remaining amount of the washer fluid and the usage time limit are calculated as the margin of the washer fluid. Then, the process proceeds to S220, and communication with the display control device 40 is performed in order to display the margin of the washer fluid calculated in S210 on a display. As a result, the display control device 40 displays the margin of the washer fluid on the display (not shown).

As described above, according to the washer control system 1 of the present embodiment, it is possible to notify the driver of the margin of the washer fluid, that is, the remaining amount of the washer fluid and the usage time limit. Therefore, the driver can grasp the margin of the washer fluid, and can be urged to replenish the washer fluid before the washer fluid is exhausted. Therefore, it is possible to maintain the function during autonomous driving by the ADAS. Further, it is possible to grasp the margin of the washer fluid with a simple system configuration without providing multiple washer level sensors.

Figure 5:
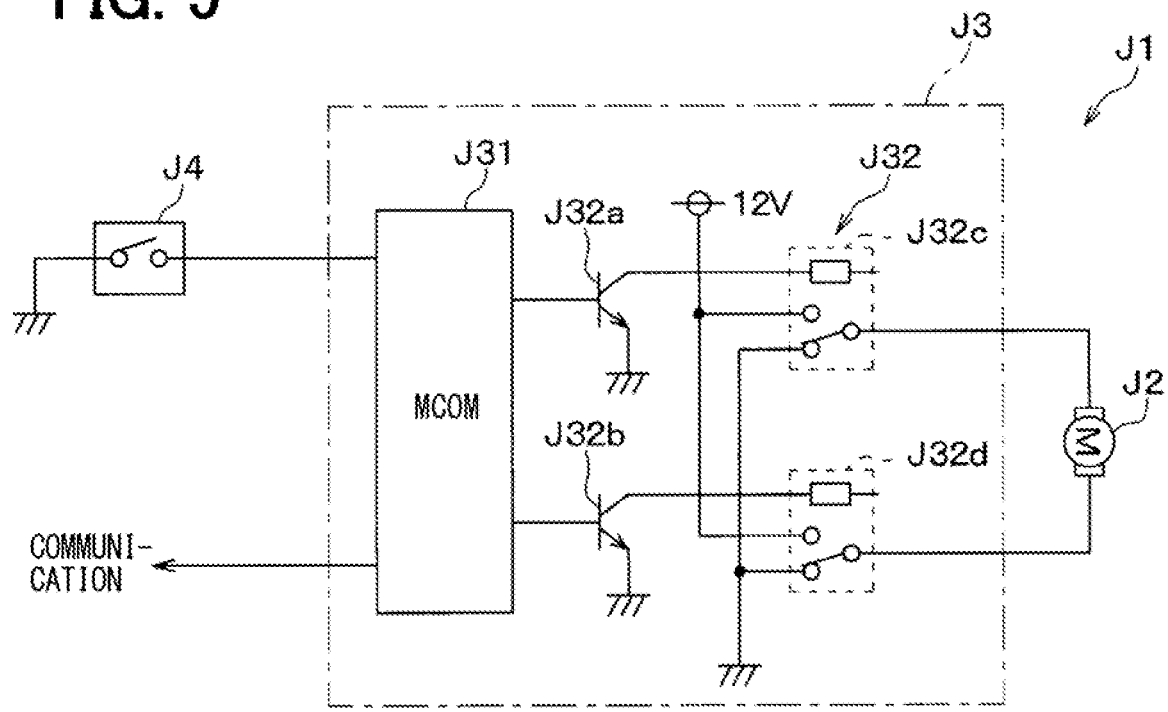
FIG. 5 is a diagram showing a circuit configuration of a washer control system according to a first comparative example provided with one washer level sensor.
Figure 6:
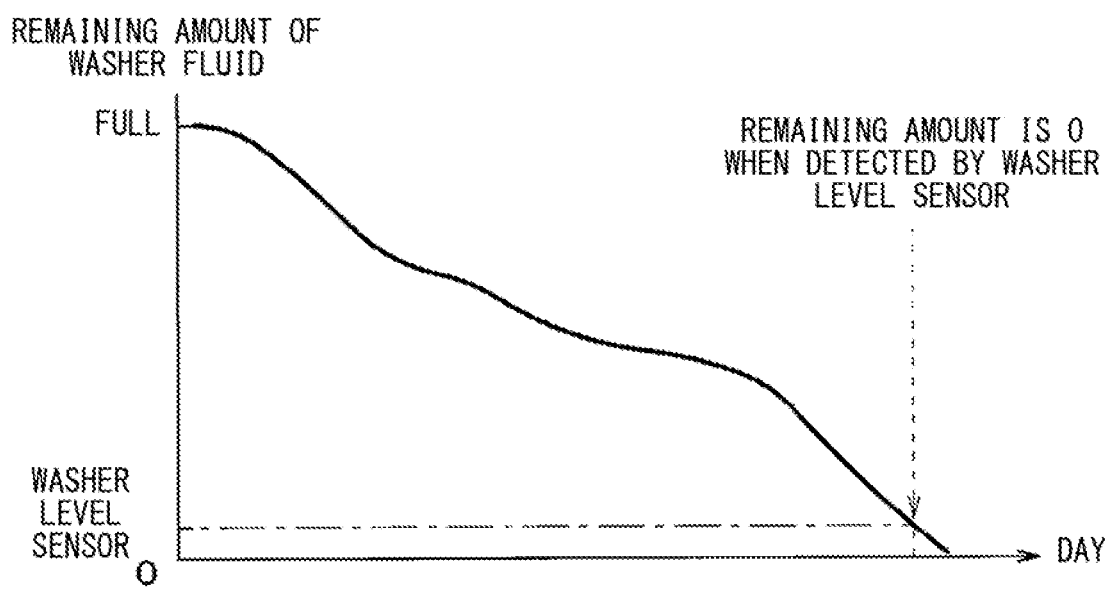
FIG. 6 is a diagram illustrating a remaining amount of a washer fluid and a timing at which the remaining amount can be detected in the washer control system having the circuit configuration of FIG. 5.
Figure 7:
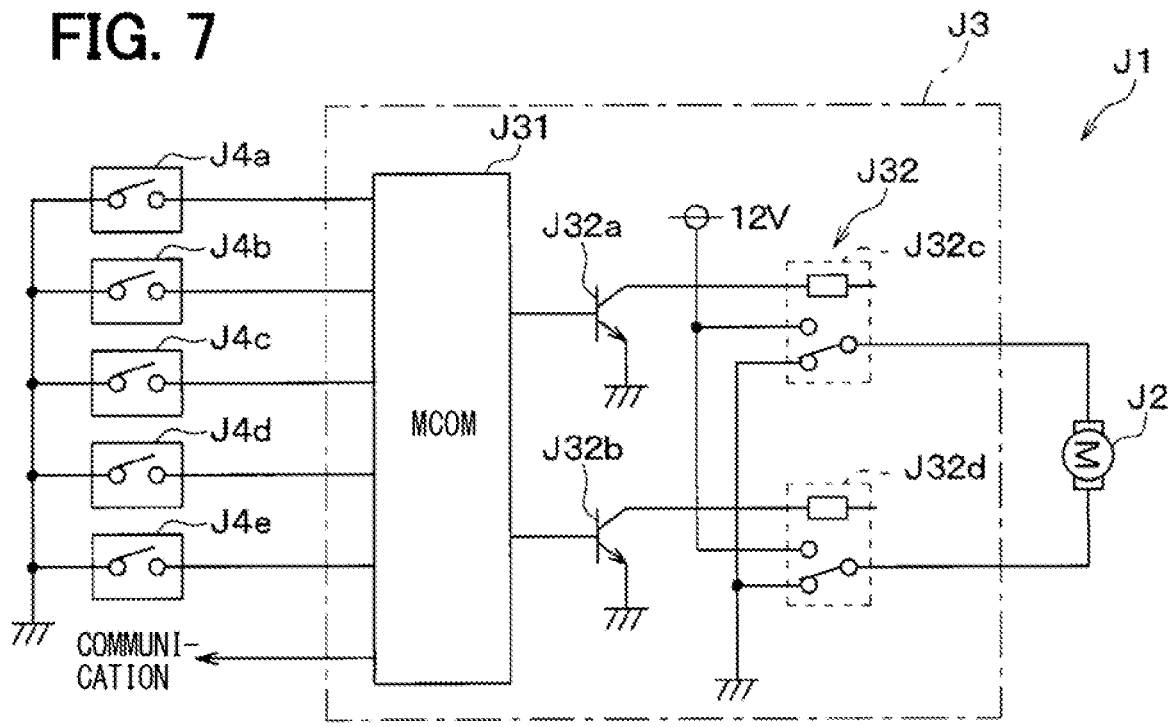
FIG. 7 is a diagram showing a circuit configuration of a washer control system according to a second comparative example provided with multiple washer level sensors.
Figure 8:
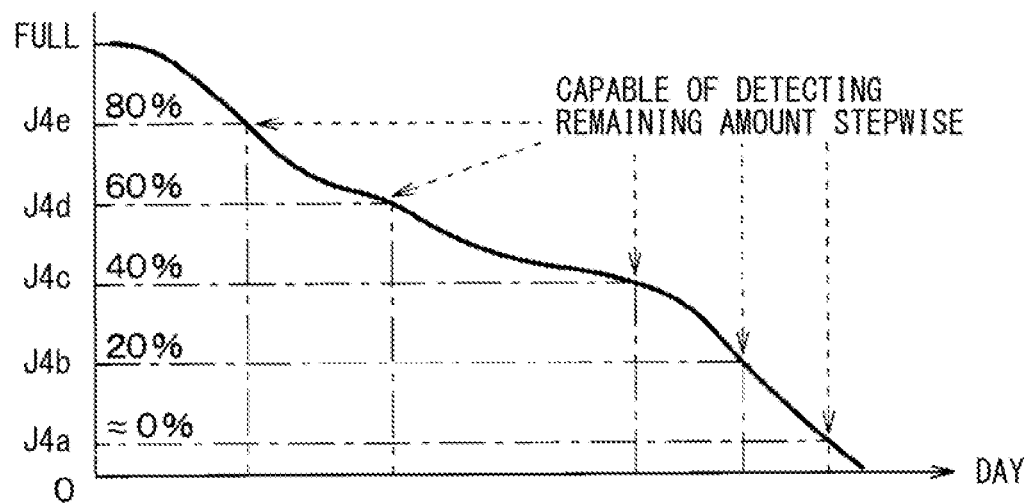
FIG. 8 is a diagram illustrating a remaining amount of a washer fluid and timings at which the remaining amount can be detected in the washer control system having the circuit configuration of FIG. 7.

As a reference, comparison with configurations of washer control systems according to comparative examples will be described. FIG. 5 shows a circuit configuration of a washer control system provided with one washer level sensor J4 according to a first comparative example. FIG. 6 shows the remaining amount of the washer fluid and the timing at which the remaining amount can be detected in the washer control system having the circuit configuration of FIG. 6. FIG. 7 shows a circuit configuration of a washer control system provided with multiple washer level sensors according to a second comparative example. FIG. 8 shows the remaining amount of the washer fluid and the timing at which the remaining amount can be detected in the washer control system having the circuit configuration of FIG. 7.

As shown in FIGS. 5 and 7, each of the washer control systems J1 according to the comparative examples sprays a washer fluid by controlling a washer motor J2 with a washer control device J3. The washer control device J3 includes a microcomputer J31 and a switch unit J32, and controls the washer motor J2 by controlling the switch unit J32 with the microcomputer J31. Specifically, the switch unit J32 has a configuration including a first transistor J32a and a second transistor J32b, and a first relay J32c and a second relay J32d. When the first transistor J32a is turned on and the second transistor J32b is turned off, a movable contact of the first relay J32c is set to a power supply potential, and a movable contact of the second relay J32d is set to the ground potential. Accordingly, a motor current through the washer motor 12 in the downward direction of FIGS. 5 and 7. As a result, the washer motor J2 is rotated in the forward direction. Further, when the first transistor J32a is turned off and the second transistor J32b is turned on, the movable contact of the first relay J32c is set to the ground potential, and the movable contact of the second relay J32d is set to the power supply potential. Accordingly, the motor current flows through the washer motor J2 in the upward direction of FIGS. 5 and 7. As a result, the washer motor J2 is rotated in the reverse direction.

Then, the washer control device system in FIG. 5 receives a detection result from one washer level sensor J4, and the washer control system in FIG. 7 receives detection results from multiple, for example, five washer level sensors J4a-J4e.

In the washer control system having the configuration shown in FIG. 5, the remaining amount of the washer fluid cannot be detected even if the washer fluid drops from the full state in the washer tank, and the remaining amount can be detected only when the detection result of the washer level sensor J4 is obtained, as shown in FIG. 6. That is, when the remaining amount of the washer fluid can be detected by the washer level sensor J4, the washer fluid reaches a predetermined value, for example, 0%.

Also in the washer control system having the configuration shown in FIG. 7, even if the remaining amount of the washer fluid drops from the full state in the washer tank, the remaining amount can be detected only when the detection results of the washer level sensors J4a to J4e are obtained, as shown in FIG. 8. That is, as compared with the washer control system shown in FIG. 5, since the multiple washer level sensors J4a to J4e are provided, the washer control system shown in FIG. 7 can detect in stages that the remaining amount of the washer fluid reaches multiple predetermined values, but the remaining amount can be detected only at the times.

Therefore, regardless of the configuration of FIGS. 5 and 7, the remaining amount of the washer fluid cannot be detected without the washer level sensors J4 and J4a to J4e, and the washer level sensors J4 and J4a to J4e can detect the remaining amount only at the predetermined values. Further, in order to detect the remaining amount of the washer fluid in multiple stages, it is necessary to provide multiple washer level sensors J4a to J4e, which leads to an increase in the number of parts of the system and an increase in system cost.

On the other hand, in the present embodiment, the usage amount of the washer fluid is estimated by calculating the motor current value and the motor energization time, that is, the spray time of the washer fluid, and subtracting the usage amount from the predetermined value after the remaining amount of the washer fluid reaches the predetermined value. Therefore, it is possible to grasp the margin of the washer fluid with a simple system configuration without providing multiple washer level sensors. Further, by notifying the usage time limit of the washer fluid, the driver can grasp the margin of the washer fluid and can be urged to replenish the washer fluid before the washer fluid is exhausted.

Second Embodiment

A second embodiment will be described. The present embodiment differs from the first embodiment in that the processing performed by the microcomputer 31 is changed, and the other parts are the same as those in the first embodiment. Therefore, only the parts different from the first embodiment will be described.

In the first embodiment, it is detected that the remaining amount of the washer fluid reaches the predetermined value, for example, 50%, and the remaining amount of the washer fluid is calculated from the predetermined value. On the other hand, in the present embodiment, the remaining amount of the washer fluid is measured from the full state of the washer tank 11, and the detection result by the washer level sensor 20 that the remaining amount of the washer fluid reaches a predetermined value is used for correction.

Specifically, when the remaining amount of the washer fluid is 50% or more, the remaining amount of the washer fluid is used as it is as the data of the margin of the washer fluid. The remaining amount of the washer fluid at this time can be calculated by subtracting the amount of the washer fluid used from the allowable limit fluid amount. Accordingly, when the remaining amount of the washer fluid is 50% or more, the remaining amount of the washer fluid is always notified to the driver.

Further, when the washer level sensor 20 detects that the remaining amount of the washer fluid reaches 50%, the remaining amount of the washer fluid calculated by the calculation unit 31g is corrected. In the present embodiment, the remaining amount of the washer fluid is constantly calculated by the calculation unit 31g, but the remaining amount of the washer fluid calculated here is an estimated value, and there may be a deviation from a correct value. On the other hand, the detection accuracy of the washer level sensor 20 detecting that the remaining amount of the washer fluid reaches 50% is higher than the estimated value calculated by the calculation unit 31g. Therefore, when the washer level sensor 20 detects that the remaining amount of the washer fluid reaches 50%, the calculation unit 31g corrects the remaining amount of the washer fluid to 50%. Then, when the remaining amount of the washer fluid is calculated thereafter in the calculation unit 31g, the remaining amount of the washer fluid is calculated by subtracting the usage amount of the washer fluid after the correction.

Figure 9:
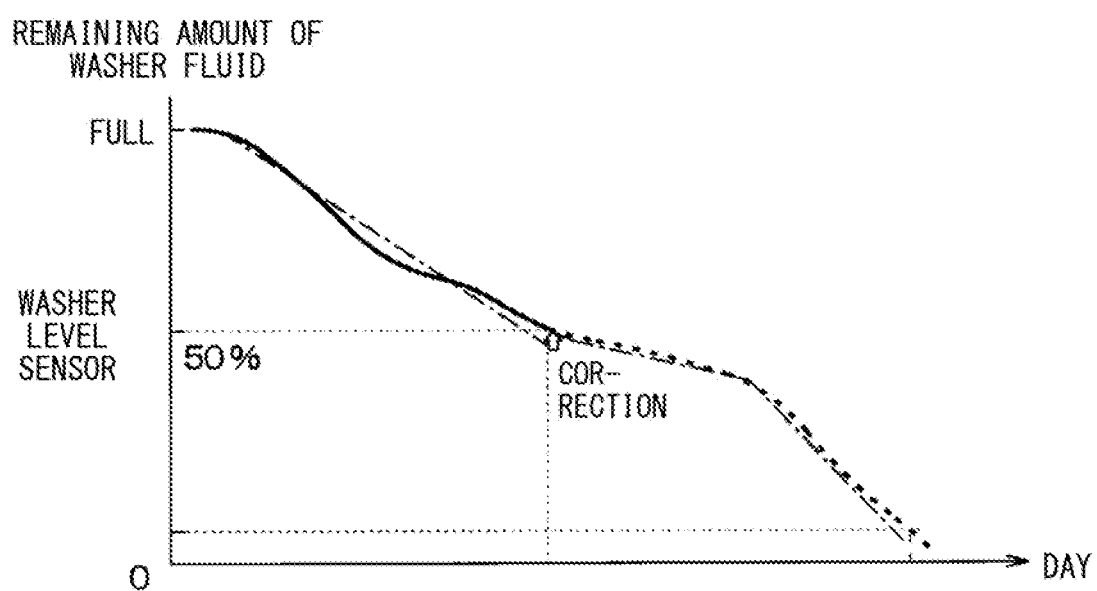
FIG. 9 is a diagram showing a change in a remaining amount of a washer fluid when the remaining amount of the washer fluid is corrected at a timing when the remaining amount of the washer fluid reaches 50%.

Accordingly, it is possible to improve the calculation accuracy of the remaining amount of the washer fluid by the calculation unit 31g. FIG. 9 is a diagram showing a change in the remaining amount of the washer fluid when the remaining amount of the washer fluid is corrected at the timing when the remaining amount of the washer fluid reaches 50%. As shown in FIG. 9, even if the remaining amount of the washer fluid calculated by subtracting the usage amount of the washer fluid from the allowable limit fluid amount is not 50% when the washer level sensor 20 detects that the remaining amount of the washer fluid reaches 50%, the remaining amount of the washer fluid is corrected to 50%. After that, the remaining amount of the washer fluid can be calculated more accurately by subtracting the amount of the washer fluid used after the remaining amount of the washer fluid reaches 50% from 50%.

Furthermore, when the remaining amount of washer fluid is less than 50%, how many days the washer fluid can be used before the remaining amount of the washer fluid becomes 0%, or a specific date the washer fluid can be used at the longest is used as the data regarding the margin of the washer fluid. The usage time limit may be calculated using an estimation line as described in the first embodiment. Also in the present embodiment, the data of the remaining amount of the washer fluid itself can be included as the data regarding the margin of the washer fluid.

Accordingly, the driver is only notified of the remaining amount when the washer fluid is still sufficient, and the driver is also notified of how long the washer fluid can be used when the remaining amount of the washer fluid is low.

Further, although the present embodiment includes one washer level sensor 20, the remaining amount of the washer fluid can be estimated even if the washer level sensor 20 is not provided. Therefore, a simpler system configuration can be obtained if the washer control system is not provided with any washer level sensor 20, and conversely, the remaining amount of the washer fluid can be estimated more accurately if the washer control system according to the present embodiment is provided with the washer level sensor 20.

The fact that the washer fluid is in a full state is input through a touch panel display (not shown) controlled by the display control device 40 when the driver or the like replenishes the washer fluid, and at that time, the remaining amount of the washer fluid is updated to 100%. Of course, an input switch may be provided separately from the display so that the fact that the washer fluid has been replenished can be input through the input switch.

Other Embodiments

While the present disclosure has been described in accordance with the embodiment described above, the present disclosure is not limited to the embodiment and includes various modifications and equivalent modifications. In addition, while the various elements are shown in various combinations and configurations, which are exemplary, other combinations and configurations, including more, less or only a single element, are also within the spirit and scope of the present disclosure.

For example, in the above embodiments, in order to suppress the deterioration of the function of the situation monitoring device 5, the front wiper 3*a* or the rear wiper 4*a* is driven to wipe off the dirt on the front windshield 3 and the rear windshield 4. However, this shows one form for suppressing the deterioration of the function of the situation monitoring device 5, and any form may be used as long as the dirt is removed by spraying the washer fluid.

As an example, when dirt is attached directly to the situation monitoring device 5, the dirt may be removed by spraying the washer fluid directly onto the situation monitoring device 5. The situation monitoring device 5 is composed of various cameras, sensors, and the like, but if dirt is attached to a lens portion of the camera or a sensing portion of the sensors, the functions related to the ADAS may deteriorate. In that case, the dirt can be appropriately cleaned by directing a spraying port of the washer sprayer 13 toward the lens portion, the sensing portion, or the like.

Further, in FIG. 1, only one switch unit 32 and one washer motor 12 are shown, but the number of the switch unit 32 and the washer motor 12 can correspond to the number of objects to which dirt is attached, that is, the number of situation monitoring devices 5 related to autonomous driving by the ADAS. Then, the washer control device 30 can clean the situation monitoring device 5 and remove the dirt by driving the washer motor 12 corresponding to the situation monitoring device 5 on which the dirt is detected and needs to be washed.

In each of the second embodiments described above, the usage time limit of the washer fluid is calculated in addition to the remaining amount of the washer fluid when the remaining amount of the washer fluid becomes equal to or less than the predetermined value. However, this is also only an example, and the usage time limit of the washer fluid may be calculated regardless of the remaining amount of the washer fluid. Further, as the margin of the washer fluid, at least the remaining amount may be calculated, and the usage time limit is an option.

Further, in each of the above embodiments, the case of notifying the driver of the margin of the washer fluid has been described. However, the present disclosure may be applied to fully autonomous driving in which autonomous driving is performed without a driver. In that case, the margin of the washer fluid may be notified to another in-vehicle ECU instead of notifying the driver. For example, in fully autonomous driving, it is conceivable to inform the in-vehicle ECU related to autonomous driving by the ADAS of the margin of the washer fluid. As a result, for example, when the washer fluid is insufficient, measures such as preventing fully autonomous driving from being carried out in the in-vehicle ECU can be taken, and an owner of the vehicle can be urged to replenish the washer fluid before fully autonomous driving.

Further, in the above embodiment, a configuration in which the washer instruction is given via the body ECU 2*a* has been described, but another configuration in which the washer instruction is given without going through the body ECU 2*a* or via another ECU may also be used.

The controller and the method thereof described in the present disclosure are implemented by a dedicated computer provided by configuring a processor and a memory programmed to execute one or more functions embodied by a computer program. Alternatively, the controller and the method described in the present disclosure may be implemented by a special purpose computer configured as a processor with one or more special purpose hardware logic circuits. Alternatively, the controller and the method described in the present disclosure may be implemented by one or more special purpose computer, which is configured as a combination of a processor and a memory, which are programmed to perform one or more functions, and a processor which is configured with one or more hardware logic circuits. The computer program may be stored, as instructions to be executed by a computer, in a tangible non-transitory computer-readable medium.

What is claimed is:

1. A washer control system comprising:
   a situation monitoring device configured to monitor a situation related to traveling of a vehicle;
   a washer tank configured to store a washer fluid;
   a washer motor configured to perform washer spraying by suctioning the washer fluid stored in the washer tank and discharging the washer fluid in order to remove dirt that hinders monitoring by the situation monitoring device, in response to energization to the washer motor;

a washer control device configured to control the washer spraying by controlling the energization to the washer motor; and a washer level sensor configured to detect that the remaining amount of the washer fluid in the washer tank reaches a predetermined value, wherein the washer control device includes a computer configured to:

monitor a motor current value that is a value of electric current supplied to the washer motor;

acquire an energization time for which the electric current is supplied to the washer motor;

calculate a usage amount of the washer fluid from the motor current value and the energization time, and calculate, as a margin of the washer fluid, a remaining amount of the washer fluid in the washer tank based on the usage amount;

calculate the remaining amount of the washer fluid by subtracting the usage amount of the washer fluid that is used after the remaining amount of the washer fluid reaches the predetermined value from the predetermined value;

calculate a daily decrease in the remaining amount of the washer fluid for several consecutive days based on a change in the remaining amount of the washer fluid for the several consecutive days from an optional day;

calculate an estimated line expressed by a linear equation by linearly approximating a relationship between the amount of decrease in the remaining amount of the washer fluid and days; and calculate, as the margin of the washer fluid, a usage time limit of the washer fluid based on the remaining amount of the washer fluid and the estimated line.

2. The washer control system according to claim 1, wherein the computer is further configured to:

count a spray time during which the washer spraying is performed and adopt the spray time as the energization time; and calculate the usage amount of the washer fluid from the motor current value and the spray time.

3. The washer control system according to claim 1, the computer is further configured to:

calculate the remaining amount of the washer fluid by subtracting the usage amount from an allowable limit fluid amount of the washer fluid in the washer tank until the washer level sensor detects that the remaining amount of the washer fluid reaches the predetermined value; and calculate the remaining amount of the washer fluid by correcting the remaining amount of the washer fluid to the predetermined value in response to the washer level sensor detecting that the remaining amount of the washer fluid reaches the predetermined value.

4. The washer control system according to claim 1, wherein the computer is further configured to:

cause a display device to display the margin of the washer fluid; and cause the display device to display the usage time limit of the washer fluid as the margin of the washer fluid when the remaining amount of the washer fluid is equal to or less than the predetermined value.

\* \* \* \* \*